US010474356B2

(12) United States Patent
Barry et al.

(10) Patent No.: US 10,474,356 B2
(45) Date of Patent: Nov. 12, 2019

(54) VIRTUAL KEYBOARD IMPROVEMENT

(71) Applicant: INTERNATIONAL BUSINESS MACHINES CORPORATION, Armonk, NY (US)

(72) Inventors: Paul M. J. Barry, Cork (IE); Vinh Tuan Thai, Cork (IE)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 15/228,476

(22) Filed: Aug. 4, 2016

(65) Prior Publication Data

US 2018/0039405 A1 Feb. 8, 2018

(51) Int. Cl.
*G06F 3/048* (2013.01)
*G06F 3/0488* (2013.01)

(52) U.S. Cl.
CPC ...... *G06F 3/04886* (2013.01); *G06F 3/04883* (2013.01); *G06F 3/048* (2013.01)

(58) Field of Classification Search
CPC ... G06F 3/04886; G06F 3/04883; G06F 3/048
See application file for complete search history.

(56) References Cited

U.S. PATENT DOCUMENTS

| | | | | |
|---|---|---|---|---|
| 5,699,455 A * | 12/1997 | Arai | | G06K 9/6255 382/187 |
| 8,077,974 B2 * | 12/2011 | Kumar | | G06F 3/03545 345/179 |
| 8,843,858 B2 | 9/2014 | Devi et al. | | |
| 2011/0221685 A1 * | 9/2011 | Lee | | G06F 3/0482 345/173 |
| 2012/0180002 A1 * | 7/2012 | Campbell | | G06F 3/04883 715/863 |

(Continued)

FOREIGN PATENT DOCUMENTS

FR 2806491 9/2001

OTHER PUBLICATIONS

Trapani, Gina; Five Alternative Android Keyboards to Speed Up Mobile Touch Typing; Retrieved from Internet on Apr. 7, 2016; URL: http://lifehacker.com/5684573/five-alternative-android-keyboards-to-spe . . . ; 4 pages.

(Continued)

*Primary Examiner* — Jeanette J Parker
(74) *Attorney, Agent, or Firm* — Schmesier, Olsen & Watts; Alexander G. Jochym

(57) ABSTRACT

A method and system for improving virtual keyboard input is provided. The method includes presenting a GUI comprising a character display portion and a virtual touch screen activated keyboard. The virtual touch screen activated keyboard internally includes currently viewable alphabetical character keys and a free sketch area for entering specialized characters not currently viewable via the virtual keyboard. A selection for an alphabetical character is received via the virtual touch screen activated keyboard and presented via the display portion. A user defined motion sketching a character associated with the specialized characters is detected from a user via the free sketch area. The character is converted into one of the specialized characters and presented to the user.

16 Claims, 5 Drawing Sheets

(56) References Cited

U.S. PATENT DOCUMENTS

| | | | |
|---|---|---|---|
| 2012/0249425 A1* | 10/2012 | Colley | G06F 3/04883 345/163 |
| 2012/0260152 A1* | 10/2012 | Shimizu | G06F 3/04883 715/217 |
| 2014/0007006 A1 | 1/2014 | Pallakoff | |
| 2014/0015782 A1* | 1/2014 | Kim | G06F 3/04883 345/173 |
| 2014/0160029 A1* | 6/2014 | Yuen | G06F 3/04886 345/169 |
| 2014/0304648 A1 | 10/2014 | Radakovitz et al. | |
| 2014/0337720 A1* | 11/2014 | Park | G06F 3/04842 715/268 |
| 2014/0372952 A1* | 12/2014 | Otero | G06F 17/246 715/835 |
| 2015/0193141 A1* | 7/2015 | Goldsmith | G06F 3/04883 345/173 |
| 2015/0371358 A1 | 12/2015 | Radakovitz et al. | |
| 2018/0285051 A1* | 10/2018 | Cawley | H04W 4/80 |

OTHER PUBLICATIONS

Touch Screen Keyboard; Retrieved from the Internet on Apr. 7, 2016; URL: http://hot-virtual-keyboard.com/touchscreen/; 3 pages.

Madhvanath, Sriganesh et al.; GeCCo: Finger Gesture-based Command and Control for Touch Interfaces; IEEE Proceedings of 4th International Conference on Intelligent Human Computer Interaction; Dec. 27-29, 2012; 6 pages.

System and method to auto-resize keys in touch-screen keyboard based on user's deletion history; IP.com; IPCOM000229592D; Aug. 6, 2013; 10 pages.

Full Program; CHI 2015 Crossings; Apr. 18-23, 2015; 4 pages.

How to improve the smartphone keyboard layout?; Retrieved from the Internet on Apr. 7, 2016; URL: http://ux.stackexchange.com/questions/22712/how-to-improve-the-smar . . . ; 9 pages.

IBM; Combined tablet/laptop computer with smart use of a mechanical and soft keyboard; ip.com; IPCOM000180663D; Mar. 13, 2009; 4 pages.

Stokel-Walker, Chris; 6 Non-QWERTY Keyboard Layouts; Retrieved from the Internet on Apr. 7, 2016; URL: http://mentalfloss.com/article/52483/6-non-qwerty-keyboard-layouts; 9 pages.

Bi, Xiaojun et al.; Bimanual Gesture Keyboard; UIST '12 Proceedings of the 25th Annual ACM Symposium on User Interface Software and Technology; Oct. 1-10, 2012; pp. 137-146.

Using the writing pad and touch keyboard in Tabled PC Input Panel; Retrieved from the Internet on Apr. 7, 2016; URL: http://windows.microsoft.com/en-US/windows7?using-writing-pad-a . . . ; 5 pages.

* cited by examiner

VIRTUAL KEYBOARD IMPROVEMENT

FIELD

The present invention relates generally to a method for improving keyboard interaction and in particular to a method and associated system for improving virtual keyboard technology by enabling a free sketch area for entering specialized characters not currently viewable via a virtual keyboard.

BACKGROUND

Accurately identifying interface input typically includes an inaccurate process with little flexibility. Switching between various interface levels with respect to retrieving interface presented characters may include a complicated process that may be time consuming and require a large amount of resources. Accordingly, there exists a need in the art to overcome at least some of the deficiencies and limitations described herein above.

SUMMARY

A first aspect of the invention provides a virtual keyboard input improvement method comprising: presenting, by a computer processor of a hardware device, a graphical user interface (GUI) comprising a character display portion and a virtual touch screen activated keyboard, wherein the virtual touch screen activated keyboard internally comprises a plurality of currently viewable predefined alphabetical character keys for inputting associated alphabetical characters and a free sketch area for entering specialized characters not currently viewable via the virtual keyboard, wherein the specialized characters are selected from the group consisting of numeric characters and symbol characters; receiving, by the computer processor from a user via at least one alphabetical character key of the plurality of currently viewable predefined alphabetical character keys, a selection for at least one specified alphabetical character associated with the at least one alphabetical character key; presenting, by the processor via the display portion, the least one specified alphabetical character; detecting, by the computer processor from the user via the free sketch area, a first user defined motion sketching at least one sketched character associated with the specialized characters; converting, by the computer processor executing a character recognition module, the at least one sketched character into at least one specialized character of the specialized characters; and presenting, by the processor via the display portion, the at least one specialized character adjacent to the at least one specified alphabetical character.

A second aspect of the invention provides a10. A computer program product, comprising a computer readable hardware storage device storing a computer readable program code, the computer readable program code comprising an algorithm that when executed by a processor of a hardware device implements a virtual keyboard input improvement method, the method comprising: presenting, by the computer processor, a graphical user interface (GUI) comprising a character display portion and a virtual touch screen activated keyboard, wherein the virtual touch screen activated keyboard internally comprises a plurality of currently viewable predefined alphabetical character keys for inputting associated alphabetical characters and a free sketch area for entering specialized characters not currently viewable via the virtual keyboard, wherein the specialized characters are selected from the group consisting of numeric characters and symbol characters; receiving, by the computer processor from a user via at least one alphabetical character key of the plurality of currently viewable predefined alphabetical character keys, a selection for at least one specified alphabetical character associated with the at least one alphabetical character key; presenting, by the processor via the display portion, the least one specified alphabetical character; detecting, by the computer processor from the user via the free sketch area, a first user defined motion sketching at least one sketched character associated with the specialized characters; converting, by the computer processor executing a character recognition module, the at least one sketched character into at least one specialized character of the specialized characters; and presenting, by the processor via the display portion, the at least one specialized character adjacent to the at least one specified alphabetical character.

A third aspect of the invention provides a hardware device comprising a computer processor coupled to a computer-readable memory unit, the memory unit comprising instructions that when executed by the computer processor implements a virtual keyboard input improvement method comprising: presenting, by the computer processor, a graphical user interface (GUI) comprising a character display portion and a virtual touch screen activated keyboard, wherein the virtual touch screen activated keyboard internally comprises a plurality of currently viewable predefined alphabetical character keys for inputting associated alphabetical characters and a free sketch area for entering specialized characters not currently viewable via the virtual keyboard, wherein the specialized characters are selected from the group consisting of numeric characters and symbol characters; receiving, by the computer processor from a user via at least one alphabetical character key of the plurality of currently viewable predefined alphabetical character keys, a selection for at least one specified alphabetical character associated with the at least one alphabetical character key; presenting, by the processor via the display portion, the least one specified alphabetical character; detecting, by the computer processor from the user via the free sketch area, a first user defined motion sketching at least one sketched character associated with the specialized characters; converting, by the computer processor executing a character recognition module, the at least one sketched character into at least one specialized character of the specialized characters; and presenting, by the processor via the display portion, the at least one specialized character adjacent to the at least one specified alphabetical character.

The present invention advantageously provides a simple method and associated system capable of accurately identifying interface input.

DETAILED DESCRIPTION

Figure 1:
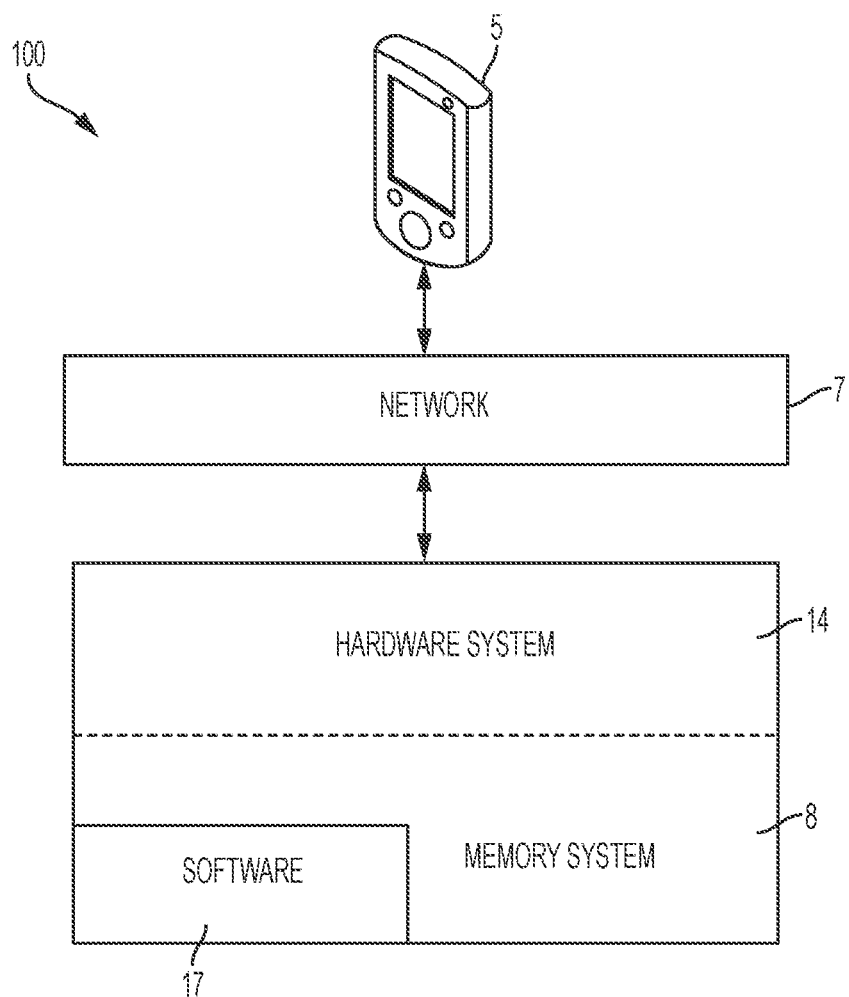
FIG. 1 illustrates a system for enabling a free sketch area for entering specialized characters not currently viewable via a virtual keyboard, in accordance with embodiments of the present invention.

FIG. 1 illustrates a system 100 for enabling a free sketch area for entering specialized characters not currently viewable via a virtual keyboard, in accordance with embodiments of the present invention. System 100 enables a virtual keyboard (e.g. of a mobile device) comprising a free hand sketch area replacing a group of seldom used specialized character keys such as, inter alia, a "+" key, a "=" key, a "−" key, a "~" key, a ":" key, a ";" key, a ">" key, a "<" key, etc. Therefore, system 100 enables a process for using alpha/numeric keys (of the virtual keyboard) to enter alpha/numeric characters and using the free hand sketch area to sketch the specialized characters. The specialized characters are converted into associated specialized characters as if entered via the virtual keyboard thereby allowing a keyboard character entry process without switching between differing keyboard layers via keyboard function keys for switching between alphabetical, numerical, and specialized character keyboards. The alpha/numeric characters and the converted sketched characters may be displayed via a display portion of the mobile device comprising the virtual keyboard (e.g., with respect to a text message, an email, etc.).

System 100 of FIG. 1 includes a user hardware device 5 connected through a network 7 to a hardware system 14. Hardware device 5 and hardware system 14 each may comprise an embedded mobile device. An embedded mobile device is defined herein as a dedicated device or computer comprising a combination of computer hardware and software (fixed in capability or programmable) specifically designed for executing a specialized function. Programmable embedded computers or devices may comprise specialized programming interfaces. Additionally, hardware device 5 and hardware system 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-4. The specialized discrete non-generic analog, digital, and logic based circuitry may include proprietary specially designed components (e.g., a specialized integrated circuit designed for only implementing an automated process for enabling a free sketch area for entering specialized characters not currently viewable via a virtual keyboard). Hardware system 14 includes a memory system 8 and software 17. Hardware system 14 and hardware device 5 may comprise mobile devices such, inter alia, as smart phones, pagers, optical head mounted display/glasses, IOT enabled clothing. Hardware device 5 may comprise a sensor/detection device(s) for sensing or detecting a user, a location, or a specified type of action for enabling the free sketch area. Sensor/detection device(s) may include, inter alia, GPS sensors, temperature sensors, infrared sensors, video retrieval devices, etc. The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

Hardware device 5 comprises a free sketch area displacing or replacing a group of character keys on a virtual keyboard. A size of a section (of the keyboard) comprising the character keys may be proportional to a size of the free sketch area (e.g., 2:1, 4:1, etc.). Additionally, a size of the free sketch area may comprise a size for accommodating single characters. Hardware device 5 enables the following implementation process for entering specialized characters not currently viewable via a virtual keyboard:

A user enables a mobile device function for entering text and a virtual keyboard is presented via the mobile device. In response, the user initiates a typing process with respect to entering desired text via the virtual keyboard. During the typing process, the user attempts to enter a character that is not presented via the virtual keyboard. Therefore, the user sketches (e.g., via usage of a finger or stylus) the character within a free sketch area of the virtual keyboard. The sketched character is converted into a keyboard entered style character and inserted into the typed text. The typing process is repeated via use of the character keys and free sketch area as necessary.

Figure 2:
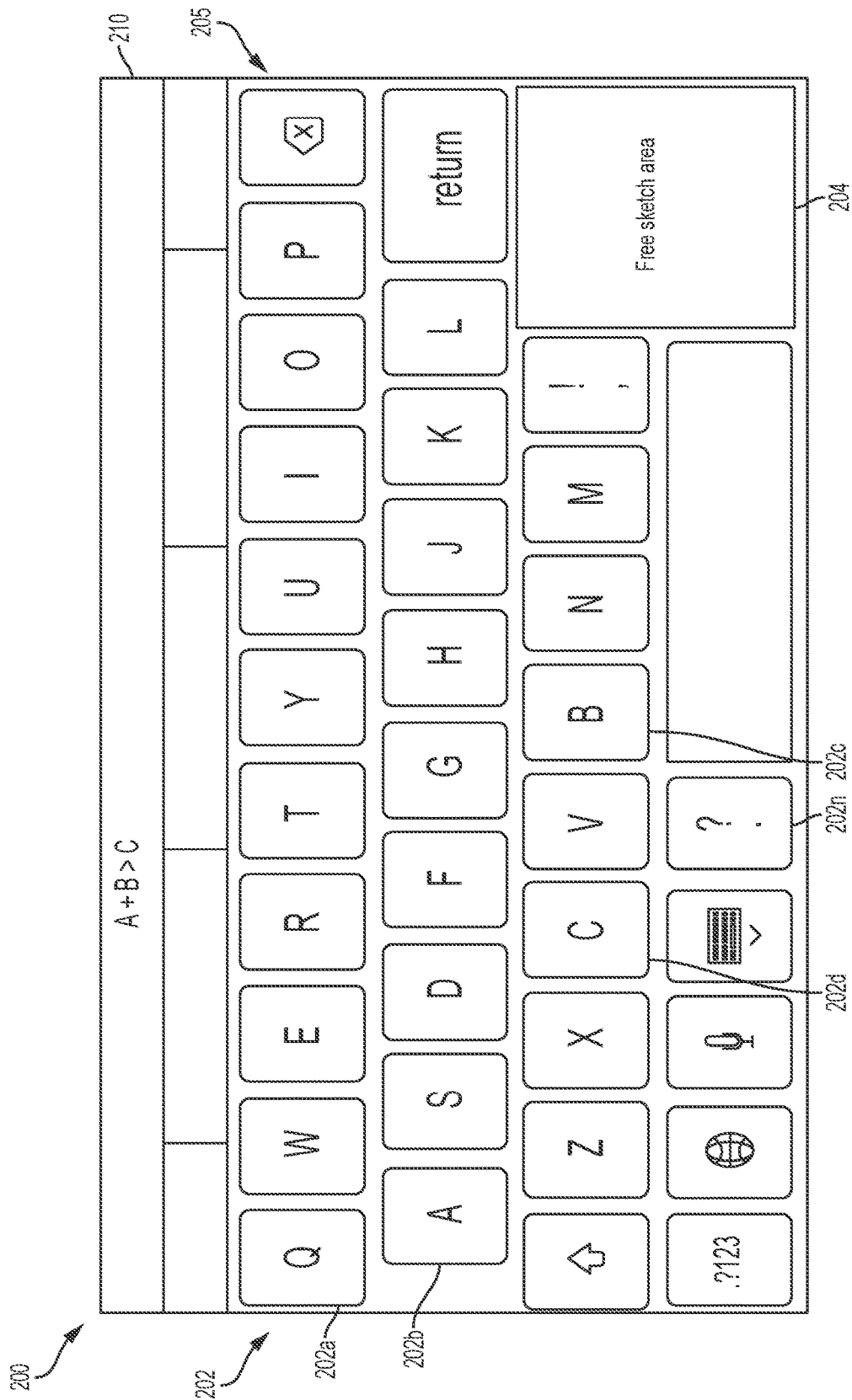
FIG. 2 illustrates a graphical user interface (GUI) comprising a display and a virtual keyboard comprising a group of character keys and a free sketch area, in accordance with embodiments of the present invention.

FIG. 2 illustrates a graphical user interface (GUI) 200 comprising a display 210 and a virtual keyboard 205 comprising a group 202 of character keys 202a . . . 202n and a free sketch area 204, in accordance with embodiments of the present invention. Free sketch area 204 may comprise a size that is equal to about four of character keys 202a . . . 202n. Display 210 presents alphabetical characters (A, B, and C) enabled via use of character keys 202b, 202c, and 202d. Additionally, display 210 presents specialized characters (+ and >) enabled via use of free sketch area 204 and converted (via a character recognition module) into the specialized characters.

Figure 3:
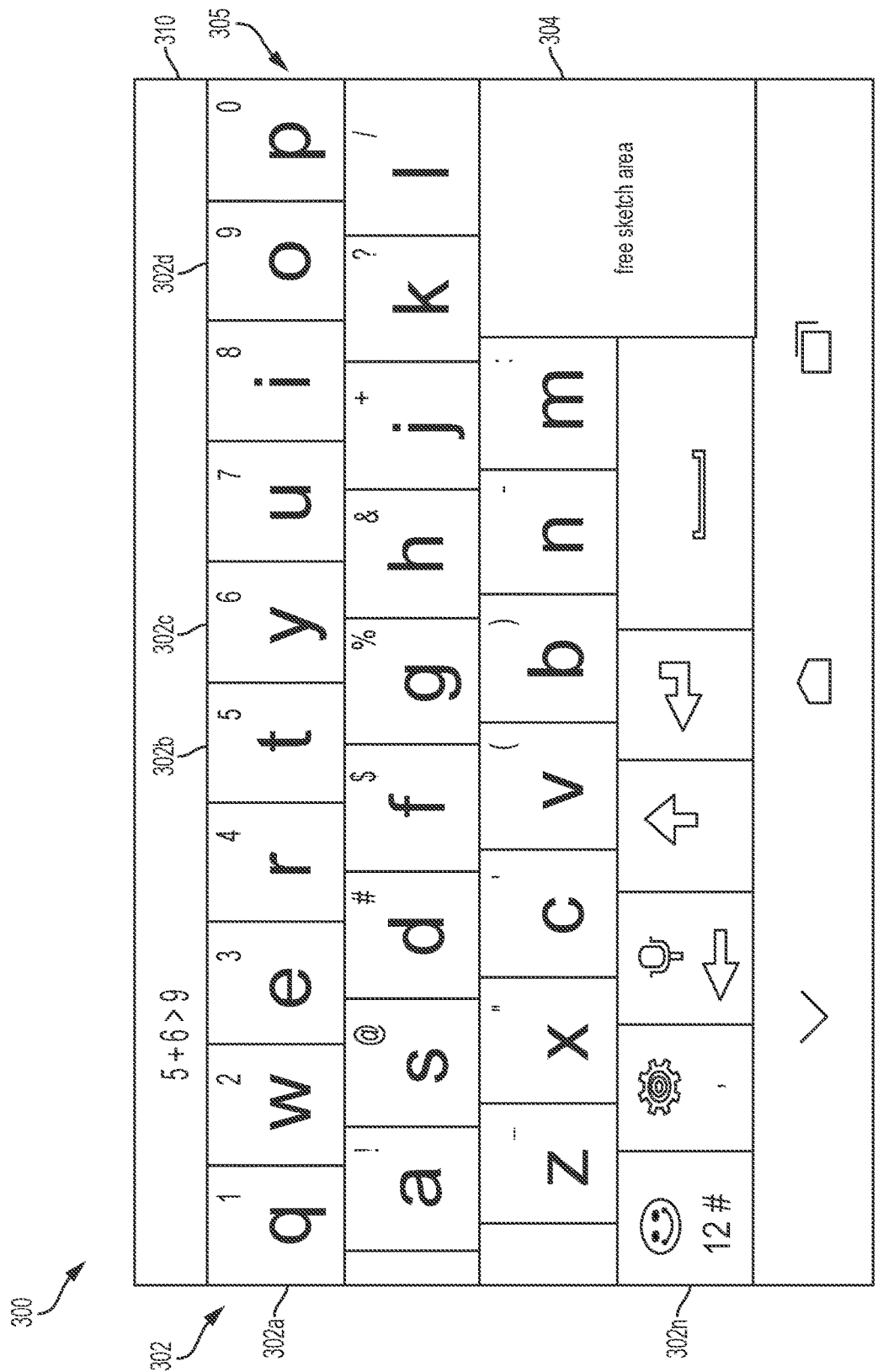
FIG. 3 illustrates an alternative GUI, in accordance with embodiments of the present invention.

FIG. 3 illustrates a GUI 300 comprising a display 310 and a virtual keyboard 305 comprising a group 302 of character keys 302a . . . 302n and a free sketch area 304, in accordance with embodiments of the present invention. Free sketch area 304 may comprise a size that is equal to about four of character keys 302a . . . 302n. Display 310 presents numerical characters (5, 6, and 9) enabled via use of character keys 302b, 302c, and 302d. Additionally, display 310 presents specialized characters (+ and >) enabled via use of free sketch area 304 and converted (via a character recognition module) into the specialized characters.

Figure 4:
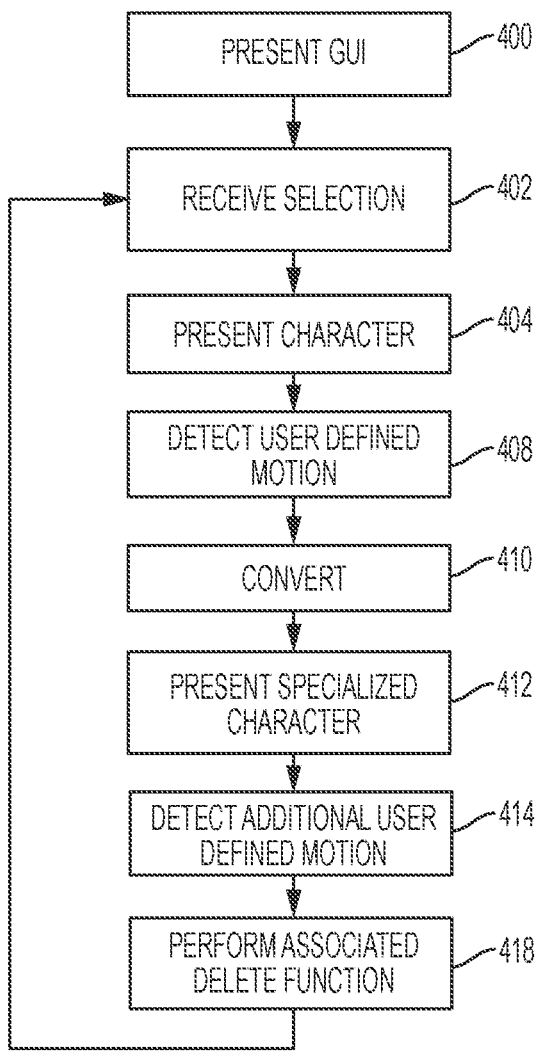
FIG. 4 illustrates an algorithm detailing a process flow enabled by the system of FIG. 1 for enabling a free sketch area for entering specialized characters not currently viewable via a virtual keyboard, in accordance with embodiments of the present invention.

FIG. 4 illustrates an algorithm detailing a process flow enabled by system 100 of FIG. 1 for enabling a free sketch area for entering specialized characters not currently viewable via a virtual keyboard, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed independently by hardware device 5 of FIG. 1. Alternatively, each of the steps in the algorithm of FIG. 4 may be enabled and executed in combination by hardware device 5 and hardware system 14 of FIG. 1. In step 300, a GUI (of a mobile device) is presented to a user. The GUI comprises a character display portion and a virtual touch screen activated keyboard. The virtual touch screen activated keyboard internally includes a plurality of currently viewable predefined alphabetical character keys (for inputting associated alphabetical characters) and a free sketch area for entering specialized characters not currently viewable via the virtual keyboard. The specialized characters may include, inter alia, numeric characters, symbol characters, etc. In step 402, a selection for a specified alphabetical character is received via an alphabetical character key of the predefined alphabetical character keys. In step 404, the specified alphabetical character is presented via the display portion. In step 408, a user defined motion sketching a sketched character (e.g., sketched within a specified portion of the free sketch area.) associated with the specialized characters is detected. In step 410, the sketched character is converted into a (display) presentable specialized character. In step 412, the presentable specialized character is presented via the display portion. In optional step 414, an additional user defined motion associated with the original user defined motion is detected (e.g., an opposite motion with respect to the original user defined motion). In step 418, an associated action is executed with respect to the specified alphabetical character (of step 404) and/or the specialized character (i.e., of step 412) presented on the display portion and step 402 is repeated. For example, the specified alphabetical character and/or the specialized character may be deleted from the display in response to the additional user defined motion detected in step 414.

Figure 5:
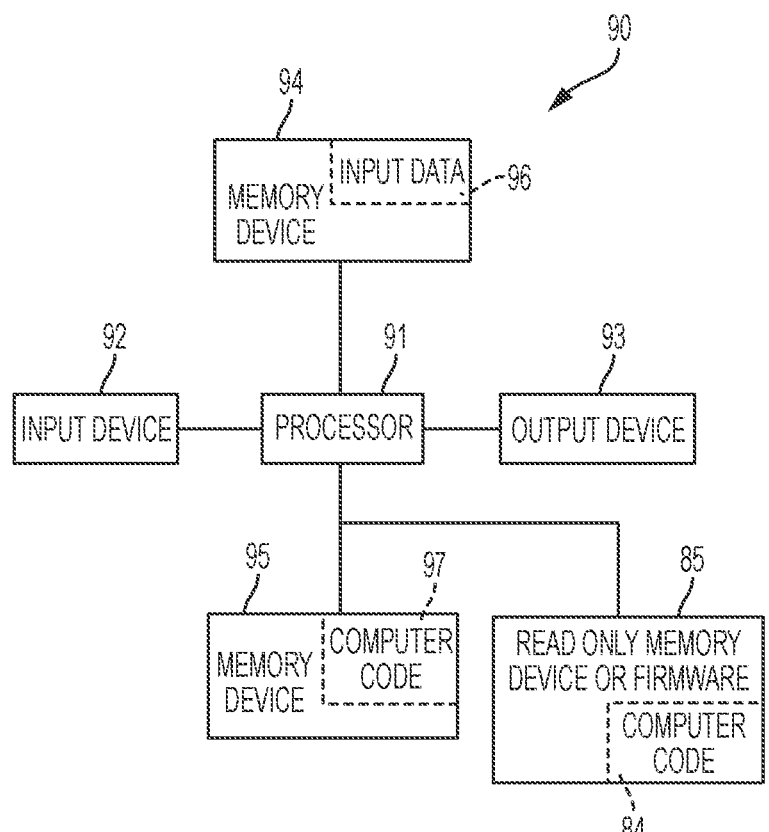
FIG. 5 illustrates a computer system used by the system of FIG. 1 for enabling a process enabling a free sketch area for entering specialized characters not currently viewable via a virtual keyboard, in accordance with embodiments of the present invention.

FIG. 5 illustrates a computer system 90 (e.g., hardware system 14 and hardware device 5) used by or comprised by the system of FIG. 1 for enabling a free sketch area for entering specialized characters not currently viewable via a virtual keyboard, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling a free sketch area for entering specialized characters not currently viewable via a virtual keyboard. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a free sketch area for entering specialized characters not currently viewable via a virtual keyboard. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for enabling a free sketch area for entering specialized characters not currently viewable via a virtual keyboard. In another embodiment, the invention provides a business method that performs the process steps of the invention on a subscription, advertising, and/or fee basis. That is, a service supplier, such as a Solution Integrator, could offer to enable a process for providing information associated with individuals for verifying creditability. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual keyboard input improvement method comprising:
    presenting, by a computer processor of a hardware device,
       a graphical user interface (GUI) comprising
       a character display portion and a virtual touch screen activated keyboard, wherein said virtual touch screen activated keyboard internally comprises
          a section comprising a plurality of currently viewable predefined alphabetical character keys for inputting associated alphabetical characters and
          a free sketch area for sketching, entering, and deleting specialized characters not currently viewable via said virtual keyboard,
            wherein said specialized characters are selected from the group consisting of numeric characters and symbol characters,
            wherein said free sketch area is located adjacent to said plurality of currently viewable predefined alphabetical character keys such that said free sketch area displaces a group of character keys for inputting said specialized characters, and wherein said section comprising said plurality of currently viewable predefined alphabetical character keys comprises a specific proportional size with respect to a size of said free sketch area;

receiving, by said computer processor, from a user via at least one alphabetical character key of said plurality of currently viewable predefined alphabetical character keys, a selection of at least one specified alphabetical character associated with said at least one alphabetical character key;

presenting, by said processor via said display portion, said at least one specified alphabetical character with a plurality of additional typed alphabetical characters being presented via said display portion;

detecting, by said computer processor from said user via said free sketch area, a first user defined motion and a second user defined motion sketching a sketched specialized character of said specialized characters;

converting, by said computer processor executing a character recognition module, said sketched specialized character, via character recognition, into a specialized character of said specialized characters; and presenting, by said processor via said display portion, said specialized character adjacent to and inserted into text comprising said at least one specified alphabetical character and said plurality of additional alphabetical characters;

detecting, by said computer processor from said user via said free sketch area, a first additional user defined motion comprising an opposite motion to said first user defined motion and a second additional user defined motion comprising an opposite motion to said second user defined motion; and deleting, by said processor, in response to said first additional user defined motion and said second additional user defined motion within said free sketch area, said sketched specialized character sketched by said first user defined motion and said second user defined motion resulting in deletion of said sketched specialized character from said free sketch area and deletion of said specialized character from said display portion.

2. The method of claim 1, wherein said free sketch area comprises a first size, wherein each alphabetical character key of said plurality of currently viewable predefined alphabetical character keys comprises a second size differing from said first size, and wherein said first size is greater than said second size.

3. The method of claim 1, wherein said specialized characters are comprised by a portion of said virtual touch screen activated keyboard currently hidden from view on the GUI.

4. The method of claim 1, wherein said selection for at least one sketched character is received within a specified portion of said free sketch area.

5. The method of claim 4, wherein said specified portion of said free sketch area corresponds to a portion of said virtual touch screen activated keyboard currently hidden from view on the GUI, and wherein said portion of said virtual touch screen activated keyboard currently hidden from view on the GUI is configured to be viewable via said GUI via activation of a function key viewable via said virtual touch screen activated keyboard.

6. The method of claim 1, further comprising:
detecting, by said computer processor from said user via said free sketch area, a second user defined motion associated with said selection for at least one specified alphabetical character; and
deleting, by said processor in response to said second user defined motion, said at least one specified alphabetical character from said display portion.

7. The method of claim 1, further comprising:
providing at least one support service for at least one of creating, integrating, hosting, maintaining, and deploying computer-readable code in the control hardware, said code being executed by the computer processor to implement: said presenting said GUI, said receiving said selection, said presenting said least one specified alphabetical character, said detecting said first user defined motion, said converting, and said presenting said at least one specialized character.

8. A computer program product, comprising a computer readable hardware storage device storing a computer readable program code, said computer readable program code comprising an algorithm that when executed by a processor of a hardware device implements a virtual keyboard input improvement method, said method comprising:
presenting, by said computer processor, a graphical user interface (GUI) comprising
a character display portion and a virtual touch screen activated keyboard, wherein said virtual touch screen activated keyboard internally comprises
a section comprising a plurality of currently viewable predefined alphabetical character keys for inputting associated alphabetical characters and
a free sketch area for sketching, entering, and deleting specialized characters not currently viewable via said virtual keyboard,
wherein said specialized characters are selected from the group consisting of numeric characters and symbol characters,
wherein said free sketch area is located adjacent to said plurality of currently viewable predefined alphabetical character keys such that said free sketch area displaces a group of character keys for inputting said specialized characters, and
wherein said section comprising said plurality of currently viewable predefined alphabetical character keys comprises a specific proportional size with respect to a size of said free sketch area;

receiving, by said computer processor, from a user via at least one alphabetical character key of said plurality of currently viewable predefined alphabetical character keys, a selection of at least one specified alphabetical character associated with said at least one alphabetical character key;

presenting, by said processor via said display portion, said at least one specified alphabetical character with a plurality of additional typed alphabetical characters being presented via said display portion;

detecting, by said computer processor from said user via said free sketch area, a first user defined motion and a second user defined motion sketching a sketched specialized character of said specialized characters;

converting, by said computer processor executing a character recognition module, said sketched specialized character, via character recognition, into a specialized character of said specialized characters; and presenting, by said processor via said display portion, said specialized character adjacent to and inserted into text comprising said at least one specified alphabetical character and said plurality of additional alphabetical characters;

detecting, by said computer processor from said user via said free sketch area, a first additional user defined motion comprising an opposite motion to said first user defined motion and a second additional user defined motion comprising an opposite motion to said second user defined motion; and deleting, by said processor in response to said first additional user defined motion and said second additional user defined motion within said free sketch area, said sketched specialized character sketched by said first user defined motion and said second user defined motion resulting in deletion of said sketched specialized character from said free sketch area and deletion of said specialized character from said display portion.

9. The computer program product of claim 8, wherein said free sketch area comprises a first size, wherein each alphabetical character key of said plurality of currently viewable predefined alphabetical character keys comprises a second size differing from said first size, and wherein said first size is greater than said second size.

10. The computer program product of claim 8, wherein said specialized characters are comprised by a portion of said virtual touch screen activated keyboard currently hidden from view on the GUI.

11. The computer program product of claim 8, wherein said selection for at least one sketched character is received within a specified portion of said free sketch area.

12. The computer program product of claim 11, wherein said specified portion of said free sketch area corresponds to a portion of said virtual touch screen activated keyboard currently hidden from view on the GUI, and wherein said portion of said virtual touch screen activated keyboard currently hidden from view on the GUI is configured to be viewable via said GUI via activation of a function key viewable via said virtual touch screen activated keyboard.

13. The computer program product of claim 8, wherein said method further comprises:

detecting, by said computer processor from said user via said free sketch area, a second user defined motion associated with said selection for at least one specified alphabetical character; and deleting, by said processor in response to said second user defined motion, said at least one specified alphabetical character from said display portion.

14. A hardware device comprising a computer processor coupled to a computer-readable memory unit, said memory unit comprising instructions that when executed by the computer processor implements a virtual keyboard input improvement method comprising:

presenting, by said computer processor, a graphical user interface (GUI) comprising a character display portion and a virtual touch screen activated keyboard, wherein said virtual touch screen activated keyboard internally comprises a section comprising a plurality of currently viewable predefined alphabetical character keys for inputting associated alphabetical characters and a free sketch area for sketching, entering, and deleting specialized characters not currently viewable via said virtual keyboard, wherein said specialized characters are selected from the group consisting of numeric characters and symbol characters, wherein said free sketch area is located adjacent to said plurality of currently viewable predefined alphabetical character keys such that said free sketch area displaces a group of character keys for inputting said specialized characters, and wherein said section comprising said plurality of currently viewable predefined alphabetical character keys comprises a specific proportional size with respect to a size of said free sketch area;

receiving, by said computer processor, from a user via at least one alphabetical character key of said plurality of currently viewable predefined alphabetical character keys, a selection of at least one specified alphabetical character associated with said at least one alphabetical character key;

presenting, by said processor via said display portion, said at least one specified alphabetical character with a plurality of additional typed alphabetical characters being presented via said display portion;

detecting, by said computer processor from said user via said free sketch area, a first user defined motion and a second user defined motion sketching a sketched specialized character of said specialized characters;

converting, by said computer processor executing a character recognition module, said sketched specialized character, via character recognition, into a specialized character of said specialized characters; and presenting, by said processor via said display portion, said specialized character adjacent to and inserted into text comprising said at least one specified alphabetical character and said plurality of additional alphabetical characters;

detecting, by said computer processor from said user via said free sketch area, a first additional user defined motion comprising an opposite motion to said first user defined motion and a second additional user defined motion comprising an opposite motion to said second user defined motion; and deleting, by said processor in response to said additional user defined motion and said second additional user defined motion within said free sketch area, said sketched specialized character sketched by said first user defined motion and said second user defined motion resulting in deletion of said sketched specialized character from said free sketch area and deletion of said specialized character from said display portion.

15. The hardware device of claim 14, wherein said free sketch area comprises a first size, wherein each alphabetical character key of said plurality of currently viewable predefined alphabetical character keys comprises a second size differing from said first size, and wherein said first size is greater than said second size.

16. The hardware device of claim 14, wherein said specialized characters are comprised by a portion of said virtual touch screen activated keyboard currently hidden from view on the GUI.

\* \* \* \* \*